March 28, 1967 S. H. PITT 3,311,369

RECORD TRANSPORT SYSTEM

Filed March 12, 1965 2 Sheets-Sheet 1

INVENTOR
SOLOMON H. PITT

BY

ATTORNEY

March 28, 1967 S. H. PITT 3,311,369

RECORD TRANSPORT SYSTEM

Filed March 12, 1965 2 Sheets-Sheet 2

3,311,369

RECORD TRANSPORT SYSTEM

Solomon H. Pitt, Norristown, Pa., assignor to Sperry Rand Corporation, New York, N.Y., a corporation of Delaware Filed Mar. 12, 1965, Ser. No. 439,150
14 Claims. (Cl. 271—45)

This invention pertains to a record transport system and more particularly, to a device for transporting discrete records into and out from a completely enclosed record handling system, which record transport system provides minimum radiation of spurious energy possibly indicative of the process or operation being conducted within the enclosed record handling system.

Due to the high concentration of electronic equipment in modern record handling systems and the necessary switching of high currents and voltages in such systems, a great deal of spurious energy is generated. This energy may be radiated away from the record handling system and affect nearby data processing or communications equipment adversely. Such energy, which may be indicative of the data being handled and of the operations being carried out, may also be monitored by unauthorized persons. In an effort to minimize this radiation, many record handling systems are located in completely enclosed rooms with proper shielding and grounding. Such enclosed rooms are highly useful when the system can be operated without operator attention. However, certain of the component units within the record handling system must be periodically serviced; for example new information bearing records must be placed within the system or removed therefrom. A usual manner of providing or removing such records requires the opening of the enclosure and the entry thereof by a machine operator to perform the necessary operations. During the time that the enclosure is open, unwanted spurious energy may be radiated to the outside. A possible way in which the radiation of such energy may be avoided is to cause the record handling system, as well as any other associated systems, to be shut down during the time that the operator is within the enclosure. Such an approach is highly undesirable in that it requires the shutting down of the system with the possible loss of information and certainly the loss of computation and data processing time.

A further approach which is employed is to mount certain peripheral equipment outside of the enclosure or to place the peripheral equipment needing operator attention near the enclosure wall and connected to the outside of the enclosure with slots. Although these approaches permit the affected peripheral equipment to be serviced, they prevent the unwanted radiation of spurious energy.

In accordance with the basic concepts of this invention a device is provided wherein the radiation of unwanted spurious energy may be held to a minimum, while facilitating the input and output of records for a record handling system. The system consists of a connecting passage of proper dimensions to cause attenuation of a large portion of the spurious energy which is permitted to leave the enclosure as a result of the introduction of said connecting passage and thus diminish the radiation of such energy. The use of such attenuators is well known in the microwave wave guide art. Placed within the connecting passage are a plurality of continuous fibrous transport belts spaced apart by a distance equal to the thickness of the record to be carried thereby. Such records are inserted between said continuous transport belts at one end of said connecting passage and carried by means of said belts through the connecting passage into the enclosure and finally placed into a hopper or other receiving device of the record handling system within said enclosure. In a similar fashion, records from the output devices of said record handling system may be inserted between said belts and carried by said belts through the connecting passage to the output means at the exit end of the passage.

The belts employed are continuous belts and therefore require a return passage. Therefore, additional microwave return passages are provided to prevent the possible radiation of energy through the return passages for said endless continuous belts. All motors and most linkages required for the operation of these belts, and for operating the record introduction and exit equipment are placed within the enclosure to further reduce the possible radiation of energy as well as the mechanical noise which normally accompanies the operation of such motors and linkages.

A first embodiment of the device employs a connecting passage of rectangular cross section and separate return passages. The belts pass through the connecting passage and return through the return passages. In a further embodiment channels are placed within the upper and lower surfaces of the connecting passage such that the belts may be recessed within the upper and lower surfaces thus permitting an overall reduction in the height of the wave guide necessary for the operation of this device. The belt is returned in additional return passages. An additional embodiment places each belt completely in a single channel, thus removing the need for separate return passages. A further embodiment employs a single pair of belts for both record input and output from the enclosure.

It is therefore an object of this invention to provide an improved form of record transporting system wherein a record may be transported with respect to a completely enclosed record handling system while holding to a minimum the radiation of spurious energy.

It is another object of this invention to provide a record transport device for transporting discrete records with respect to a completely enclosed record handling system and employing a plurality of microwave wave guide sections of sufficient width to accept the record to be transported to said fully enclosed record handling system and having a length which is some multiple of the width of the record card such that the total microwave wave guide is sufficient to attenuate substantially all of the spurious energy that otherwise might be radiated as a result of placing an opening in said enclosure.

It is still another object of this invention to provide a record transport device for transporting discrete records into and out from a completely enclosed record handling system and employing common transport belts.

It is yet another object of this invention to provide a record transport device for transporting discrete records with respect to a completely enclosed record handling system employing microwave wave guide sections and passing continuous fibrous belts through said passages in order that said records may be transported from an external device to a receiving device within said enclosed record handling system, or vice versa.

It is yet another object of this invention to provide a record transport device for transporting discrete records with respect to a completely enclosed record handling system which employs lengths of microwave wave guide, such wave guide having channels in its upper and lower surfaces to permit the passage of fibrous continuous belts therethrough and permitting a general reduction in the height of such microwave wave guide sections.

It is yet another object of this invention to facilitate the transportation of record cards to a completely enclosed record handling system while preventing the record handling system within said enclosure from radiating energy indicative of the operation being carried out by said enclosed record handling system.

Other objects and features of the invention will be pointed out in the following description and claims and illustrated in the accompanying drawings, which disclose, by way of example, the principal of the invention and the best mode which has been contemplated for carrying it out.

In the drawings.

Similar elements will be given similar reference characters in each of the respective figures.

Figure 1:
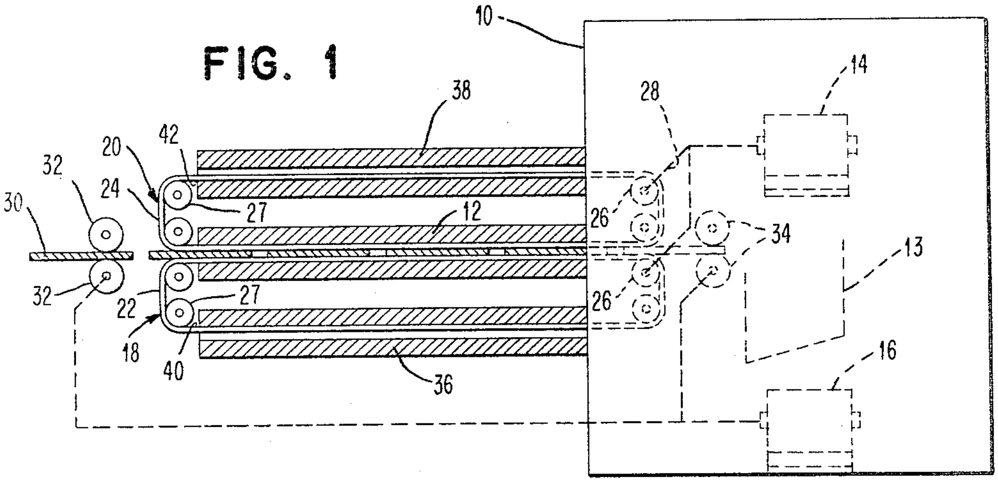
FIGURE 1 is a simplified side view of a record transport device constructed in accordance with the basic concepts of this invention.

Turning now to FIGURE 1 there is shown a first embodiment of a record transport device constructed in accordance with the basic concepts of this invention. The record handling system, which may be any of the available data processing systems employing discrete record input and output (not shown) is placed in an enclosure 10 which may be constructed of suitable shielding materials and properly grounded. For the sake of simplicity, only a single record receiving hopper 13 of the record handling system is shown within the enclosure 10. The hopper 13 will store the records transported from outside of the enclosure 10 until the record handling system is ready to employ them. Also located within the enclosure 10 are a pair of motors 14 and 16. The motor 14, as will be described below, is used to control the drive rollers for the continuous belts. The motor 16 is employed to control the advancing rollers for the record card as it enters and leaves the record transport device. The largest portion of the linkages associated with motors 14 and 16 are also within the enclosure 10 to reduce the transmission of their mechanical noise.

Communicating with an opening in the side wall of the enclosure 10 is a microwave wave guide connecting passage 12. This wave guide 12 at its opening will have a width slightly in excess of the width of the record to be passed along the connecting passage. In order to achieve proper attenuation within the wave guide, of any signals which are radiated from the record handling system, the wave guide 12 must be of sufficient length to attenuate such signals. It has been empirically found that the length of such a wave guide must be at least two or more times greater than the width of the microwave wave guide. Thus, if the record transport device is to handle, for example, a standard 80 column punch record card (approximately three by seven inches) fed along its seven inch dimension, the guide must be approximately seven and one-half inches in width and at least fifteen inches in length. It is quite obvious that should no means be provided to insure that the record card being transported maintains its proper relationship to the side walls of the microwave wave guide, the record could turn within the guide as it is moved. Such a turning of the record card could cause the record card to jam within the guide or to jam within the feed rolls at the entry and exit portions of the record transport device. Further, since the length of the record card along its direction of travel is three inches and the total length of the wave guide 12 must be at least fifteen inches in length, it is possible that the initial energy imparted to the record card as it enters the microwave wave guide may be dissipated due to frictional forces and the record card not caused to travel the entire length of the guide and enter the feed rolls at the exit end. To provide for the proper controlled motion of a record card from an input feeding mechanism, through the microwave wave guide, to the output receiving hopper 13, the record transport mechanism of the instant invention employs two continuous fiber belts 18 and 20. The belts 18 and 20 are passed through the wave guide 12 so that an upper surface 22 of belt 18 and an upper surface 24 of belt 20 are provided within the microwave wave guide connecting passage 12. The belts 18 and 20 pass over sets of drive wheels 26 which are driven by motor 14 via linkages 28. The belts also pass over further sets of idler wheels 27 which support said belts and insure proper tension therein. The motor 14, as has been stated above, and the linkages 28 to the drive wheels 26 are located wholly within the enclosure 10, and thus the noise which is generated by the motor units are isolated from the area outside of the enclosure 10.

Discrete records 30 such as the punch record cards are fed along the lengths of the belts 18 and 20 between the surface 22 of belt 18 and the surface 24 of the belt 20. The record cards 30 are initially inserted into the interspace between said belts by means of a pair of feed rolls 32 which are driven by linkages 33 from the motor 16, partially located within the enclosure 10. At the exit end of the connecting passage and within the enclosure 10 there are located a further set of feed rolls 34 also linked to and driven by means of the motor 16.

The return path for the belt 18 is a microwavè wave guide return passage 36 and the return passage for the belt 20 is a further microwave wave guide 38. The return passages for the belts 18 and 20 must also be microwave wave guide sections to attenuate the spurious energy from within the enclosure 10 which could be radiated to the outside through these openings. The wave guides 36 and 38 have the same general width and length dimensions as the connecting passage 12 but will be of significantly smaller height in that it is only necessary to provide clearance for the passage for a single belt and not for two belts and a record as is necessary in the connecting passage 12.

Figure 3:
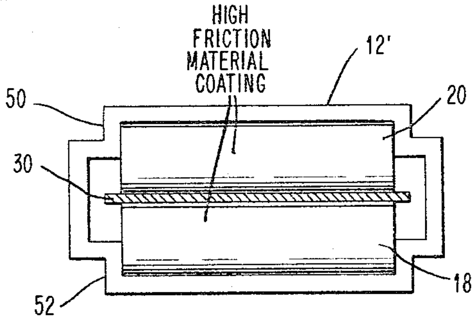
FIGURE 3 is a simplified front view of an alternative embodiment of the wave guide connecting passage and transport belts of FIGURE 1.

Further to insure that the belts will have maximum frictional contact with the records to permit correct control over said records as to position and speed of movement from the feed roll 32 via the belts 18 and 20 and the further feed rolls 34 into the enclosure 10, the upper surfaces 22 and 24 of the belts 18 and 20, respectively may be coated with a high friction material (FIG. 3). The lower surfaces 40 and 42 of the belts 18 and 20 may be coated with a low friction material such that the passage of the belts 18 and 20 over the microwave wave guides 12, 36 and 38 is not impeded.

In operation, a plurality of record cards 30 may be placed within a hopper of a card feeding device (not shown) and individually presented to the feed rollers 32 in a sequential manner. The feed rolls 32, driven by means of the motor 16 via linkage 33, will then cause individual record cards 30 to be inserted between the top surfaces 22 and 24 of the belts 18 and 20, respectively, and carried along by these belts as they are moved under the control of the motor 14, drive wheels 26 and linkages 28. Due to the close spacing of the belts 18 and 20 and the frictional surface material on the belts 18 and 20, the record cards 30 will be controlled so as to pass at a desired speed and position through the connecting passage 12. At the opposite end of the record transport device and within the enclosure 10 a further set of feed rolls 34, driven by the motor 16 via linkage 33 will pick up the record card 30 and cause the record card 30 to be deposited into an input hopper 13 of the record handling system. The belt 18 will then continue over the drive wheels 26 and will be returned through the return microwave wave guide passage 36 to the initial point passing over the idler rolls 27 where the belt will again return into the connecting passage 12. In a similar manner the upper belt 20 will be caused, after leaving the connecting passage 12, to pass over the drive wheels 26, thence through the return microwave wave guide passage 38 and thence over further idler rolls 27 to return again to the connecting passage 12. The idler rolls 27 are not driven but are merely provided to insure that the belts 18 and 20 are supported and maintained at the desired tension.

By employing the record transport device as described above, it is possible to supply additional record cards to the record punching or reading device of the record handling system within the enclosure 10 and to remove record cards from said record punch or record reading and conduct them to an outside utilizing device without the necessity for opening the enclosure 10 thus permitting the radiation of spurious energy from within the enclosure 10.

Figure 2:
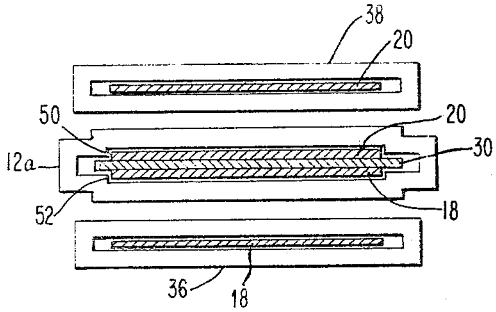
FIGURE 2 is a simplified front view of an alternative embodiment of the wave guide connecting passage of FIGURE 1.

Refer now to FIGURE 2 which shows in simplified form a further version of the microwave wave guide connecting passage. The wave guides 36 and 38 of FIGURE 2 correspond to similar elements in FIGURE 1 and the waveguide 12*a* of FIGURE 2 corresponds in general to waveguide 12 of FIGURE 1. However, waveguide 12*a* is constructed differently than waveguide 12. In this embodiment the microwave wave guide connecting passage 12*a* incorporates a depressed channel area 50 in the upper surface of the wave guide 12*a* and a further depressed channel area 52 in the lower surface of the wave guide 12*a*. By means of these channels 50 and 52 it is possible to recess the belts 18 and 20 within these channels and thus reduce the overall height of the microwave wave guide 12 as shown in FIGURE 1. Such an arrangement could also be employed where it is necessary to transport records of extreme thickness through such a wave guide without greatly increasing the overall height of a microwave wave guide in the rectangular form as shown in FIGURE 1.

It is also possible with the arrangement of FIGURE 3 to cause the belts 18 and 20 to be transported wholly within the microwave wave guide 12′ and thus to eliminate the necessity for the additional microwave wave guide return passages 36 and 38. In such an arrangement the belt 20 would pass along the central portion of the wave guide 12′ on its motion into the enclosure 10 and would then return over a set of drive wheels with its surface 24 close to the upper surface of the microwave wave guide 12′. In a similar fashion the belt 18 would be moving in a direction towards the enclosure 10 with its upper surface 22 close to the central portion to the wave guide 12′ and would return such that its surface 22 was close to the bottom portion of the channel 52 of the wave guide 12′. As stated above, this would remove the necessity for including the additional microwave wave guide passages 36 and 38.

If it is desired to transport record cards from within the enclosure 10 to some output utilizing device, then the discussion above could be reversed by merely reversing the motors 14 and 16. Should it be desired that a record transport device be available for transporting records into and out from the enclosure 10 without the necessity for stopping and reversing the motors 14 and 16, two or more of these record transport devices may be provided for the specific function of transporting cards to or transporting cards from the enclosure 10.

Figure 4:
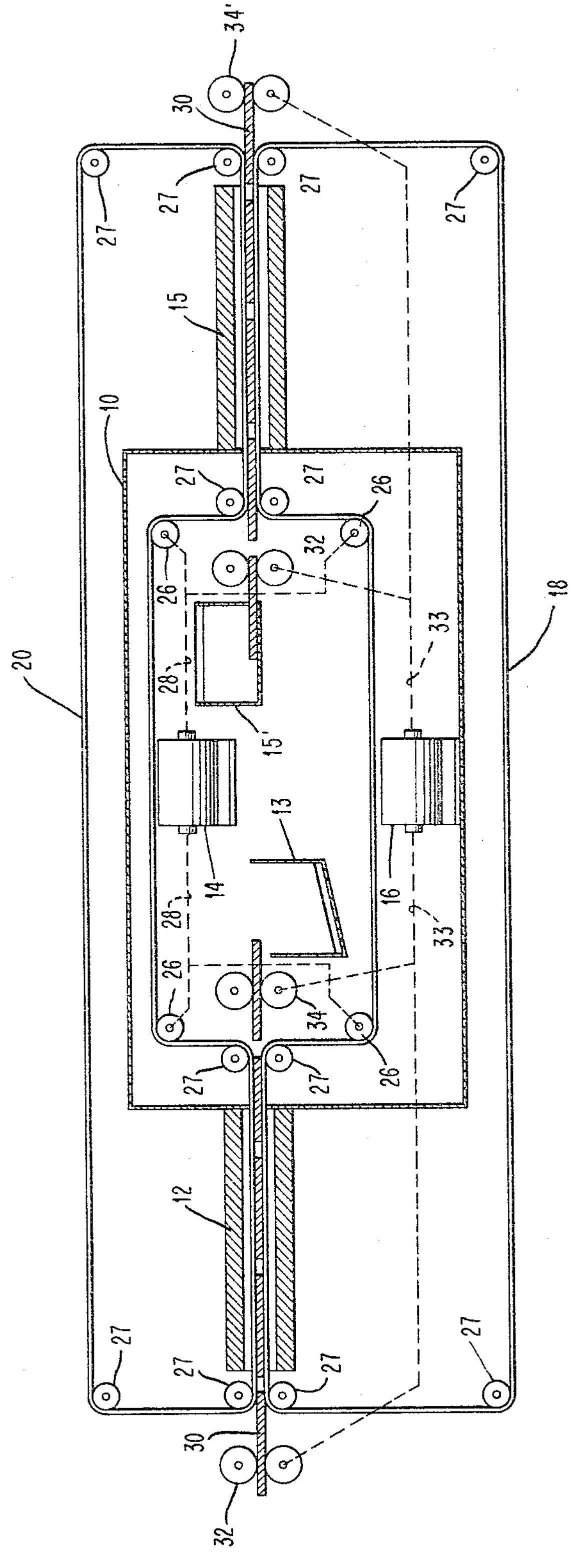
FIGURE 4 is a simplified side view of a further embodiment of the record transport device employing common transport belts for record input and output for an enclosed record handling system.

FIGURE 4 shows a further arrangement, in highly schematic form, of the record transport device of FIGURE 1, employing a single set of transport belts and two connecting passages to provide both record input and output for a completely enclosed record handling system. The belts 18 and 20 are conducted through connecting passage 12 into the enclosure 10 and then through a second connecting passage 15 out from the enclosure 10. The belt 18 is conducted over idler rolls 27 and passes under the enclosure 10, over further idler rolls 27 and returns to the connecting passage 12. In a similar manner belt 20 passes over enclosure 10 and is returned to connecting passage 12. A record card feeding device 15 is schematically shown within the enclosure 10 to show a possible source of record cards which must be removed from the enclosure 10. These cards are fed by feed rolls 32′ to the interspace between belts 18 and 20 and are carried through connecting passage 15 to the exit. At the exit of the connecting passage 15, the record cards are moved by further feed rolls 34′ to the utilization device (not shown). The feed rolls 32′ and 34′ are driven by linkage 33 from motor 16.

The connecting passages 12 and 15 may also take the shape of the wave guides shown in FIGURES 2 and 3 and the belts 18 and 20 may be passed within the depressed areas 50 and 52 and returned outside of the enclosure 10 or fully within the depressed areas of the wave guide as shown in FIGURE 3.

While there have been shown and described four embodiments of the invention, it is obvious that one skilled in the art may make certain additions or omissions to the embodiments disclosed without departing from the basic concepts of this invention.

The embodiments of the invention in which an exclusive property or privilege is claimed are defined as follows:

1. In a record transport device for transporting discrete records with respect to a completely enclosed record handling system, said record handling system capable of radiating spurious energy indicative of the operation of said record handling system, a connecting passage communicating with said record handling system; two return passages communicating with said record handling system, said return passages located adjacent said connecting passage; a first continuous transport belt passing through said connecting passage and one of said return passages; a second continuous transport belt passing through said connecting passage and the second of said return passages; said first and second continuous transport belts being spaced apart in said connecting passage by the thickness of said records; said connecting passage and said return passages comprising lengths of microwave wave guides of sufficient width to permit the passage of said first and second continuous transport belts therethrough and of sufficient length to substantially prevent the radiation of energy from within said completely enclosed record handling system; drive means coupled to said continuous transport belts to drive said belts in either of two directions and means to insert said discrete records between said moving continuous transport belts whereby said records are transported with respect to said completely enclosed record handling system with minimum unwanted radiation of energy from within said completely enclosed record handling system.

2. A device as defined in claim 1, wherein said first and second continuous transport belts are fibrous belts having a high friction material coating on the surface contacting said records.

3. A device as defined in claim 1, wherein said first and second continuous transport belts are fibrous belts having a high friction material coating on the belt surfaces contacting said records and a low friction material coating on the belt surfaces contacting said connecting and return passages.

4. A device as defined in claim 1, wherein the length of said microwave wave guide is a multiple of the dimension of said record transverse to the direction of movement of said record in said connecting passage.

5. A device as defined in claim 4, wherein said first and second continuous transport belts are fibrous belts having a high friction material coating on the belt surfaces contacting said records and a low friction material coating on the belt surfaces contacting said connecting and return passages.

6. A device as defined in claim 1, wherein said connecting passages have depressed channels in both the top and bottom surfaces of said microwave wave guide extending in the direction of desired record transport, said channels being of sufficient width and depth to permit the passage of the continuous transport belts therethrough, one belt through each channel, whereby a microwave wave guide of minimum height may be employed.

7. In a record transport device for transporting discrete records with respect to a completely enclosed record handling system, said record handling system capable of radiating spurious energy indicative of the operation of said record handling system; a connecting passage communicating with said record handling system, said connecting passage comprising a length of microwave wave guide of sufficient width to permit the passage of said discrete records therethrough and of sufficient length to substantially prevent the radiation of energy from within said completely enclosed record handling system; said connecting passage further having depressed channels in both the top and bottom surfaces of said microwave wave guide extending in the direction of desired record transport; a first continuous transport belt mounted within one of said channels; a second continuous transport belt mounted within the second one of said channels and having one surface thereof spaced apart from a like surface of said first continuous transport belt a distance sufficient to permit the insertion of said discrete records therebetween; drive means coupled to said continuous transport belts to drive said belts in either of two directions and means to insert said discrete records between said moving continuous transport belts whereby said records are transported with respect to said completely enclosed record handling system with minimum unwanted radiation of energy from within said completely enclosed record handling system.

8. In a record transport device for transporting discrete records with respect to a completely enclosed record handling system, said record handling system capable of radiating spurious energy indicative of the operation of said record handling system, a first connecting passage communicating with said record handling system; a second connecting passage communicating with said record handling system; a first continuous transport belt passing through said first connecting passage, said enclosed record handling system and said second connecting passage; a second continuous transport belt passing through said first connecting passage, said enclosed record handling system and said second connecting passage; said first and second continuous transport belts being spaced apart in said connecting passages by the thickness of said records; said connecting passages comprising lengths of microwave wave guides of sufficient width to permit the passage of said first and second continuous transport belts therethrough and of sufficient length to substantially prevent the radiation of energy from within said completely enclosed record handling system; drive means coupled to said continuous transport belts to drive said belts in either of two directions; means to insert said discrete records between said moving continuous transport belts and means to remove said discrete records from between said moving continuous transport belts whereby said records are transported with respect to said completely enclosed record handling system with minimum unwanted radiation of energy from within said completely enclosed record handling system.

9. A device as defined in claim 8, wherein said first and second continuous transport belts are fibrous belts having a high friction material coating on the surface contacting said records.

10. A device as defined in claim 8, wherein said first and second continuous transport belts are fibrous belts having a high friction material coating on the belt surfaces contacting said records and a low friction material coating on the belt surfaces contacting said first and second connecting passages.

11. A device as defined in claim 8, wherein the length of said microwave wave guide is a multiple of the dimension of said record transverse to the direction of movement of said record in said connecting passages.

12. A device as defined in claim 11, wherein said first and second continuous transport belts are fibrous belts having a high friction material coating on the belt surfaces contacting said records and a low friction material coating on the belt surfaces contacting said first and second connecting passages.

13. A device as defined in claim 8, wherein said connecting passages have depressed channels in both the top and bottom surfaces of said microwave wave guide extending in the direction of desired record transport, said channels being of sufficient width and depth to permit the passage of the continuous transport belts therethrough, one belt through each channel, whereby a microwave wave guide of minimum height may be employed.

14. A device as defined in claim 12, wherein said connecting passages have depressed channels in both the top and bottom surfaces of said microwave wave guide extending in the direction of desired record transport, said channels being of sufficient width and depth to permit the passage of the continuous transport belts therethrough, one belt through each channel, whereby a microwave wave guide of minimum height may be employed.

References Cited by the Examiner

UNITED STATES PATENTS

| | | | |
|---|---|---|---|
| 1,320,466 | 4/1919 | Finster et al. | |
| 2,649,302 | 8/1953 | Johnson et al. | 271—68 X |
| 2,970,514 | 2/1961 | Collins | 271—45 X |
| 3,083,961 | 4/1963 | Arbter | 271—33 |
| 3,134,183 | 5/1964 | Duflot | 271—45 X |

M. HENSON WOOD, Jr., *Primary Examiner.*

J. N. ERLICH, *Assistant Examiner.*